United States Patent [19]
Flory

[11] 3,738,712
[45] June 12, 1973

[54] ANTI-LOCK BRAKE SYSTEM
[75] Inventor: Donald M. Flory, Arcanum, Ohio
[73] Assignee: General Motors Corporation, Detroit, Mich.
[22] Filed: May 7, 1971
[21] Appl. No.: 141,131

[52] U.S. Cl. ................................. 303/21 F, 303/10
[51] Int. Cl. ............................................. B60t 8/12
[58] Field of Search .................... 303/2, 9, 10, 13, 303/21 F, 21 CG; 188/181

[56] References Cited
UNITED STATES PATENTS
| | | | |
|---|---|---|---|
| 3,401,982 | 9/1968 | Walker et al. | 303/21 F |
| 3,526,440 | 9/1970 | Blair | 303/2 X |
| 3,617,097 | 11/1971 | Grabb | 303/2 |
| 3,524,683 | 8/1970 | Stelzer | 303/21 F |
| 3,586,388 | 6/1971 | Stelzer | 303/10 |

Primary Examiner—Duane A. Reger
Attorney—W. E. Finken and D. D. McGraw

[57] ABSTRACT

An anti-lock brake system includes separate hydraulically boosted master cylinders for each wheel brake or set of wheel brakes to be controlled, an operated actuated brake control valve assembly functioning to channel pump generated fluid pressure to the plurality of hydraulic boosters for simultaneous actuation thereof and including valve means functioning to charge an accumulator with fluid pressure and then discharge the accumulator pressure for booster actuation in the event of a loss of pump generated pressure, a fail safe anti-lock control valve circuit controlling the brakes by releasing and reapplying the hydraulic pressure to the hydraulic boosters in response to the sensed wheel condition, and auxiliary mechanical actuating means for brake actuation subsequent to loss of pump generated fluid pressure and dissipation of the accumulator pressure.

5 Claims, 1 Drawing Figure

PATENTED JUN 12 1973
3,738,712
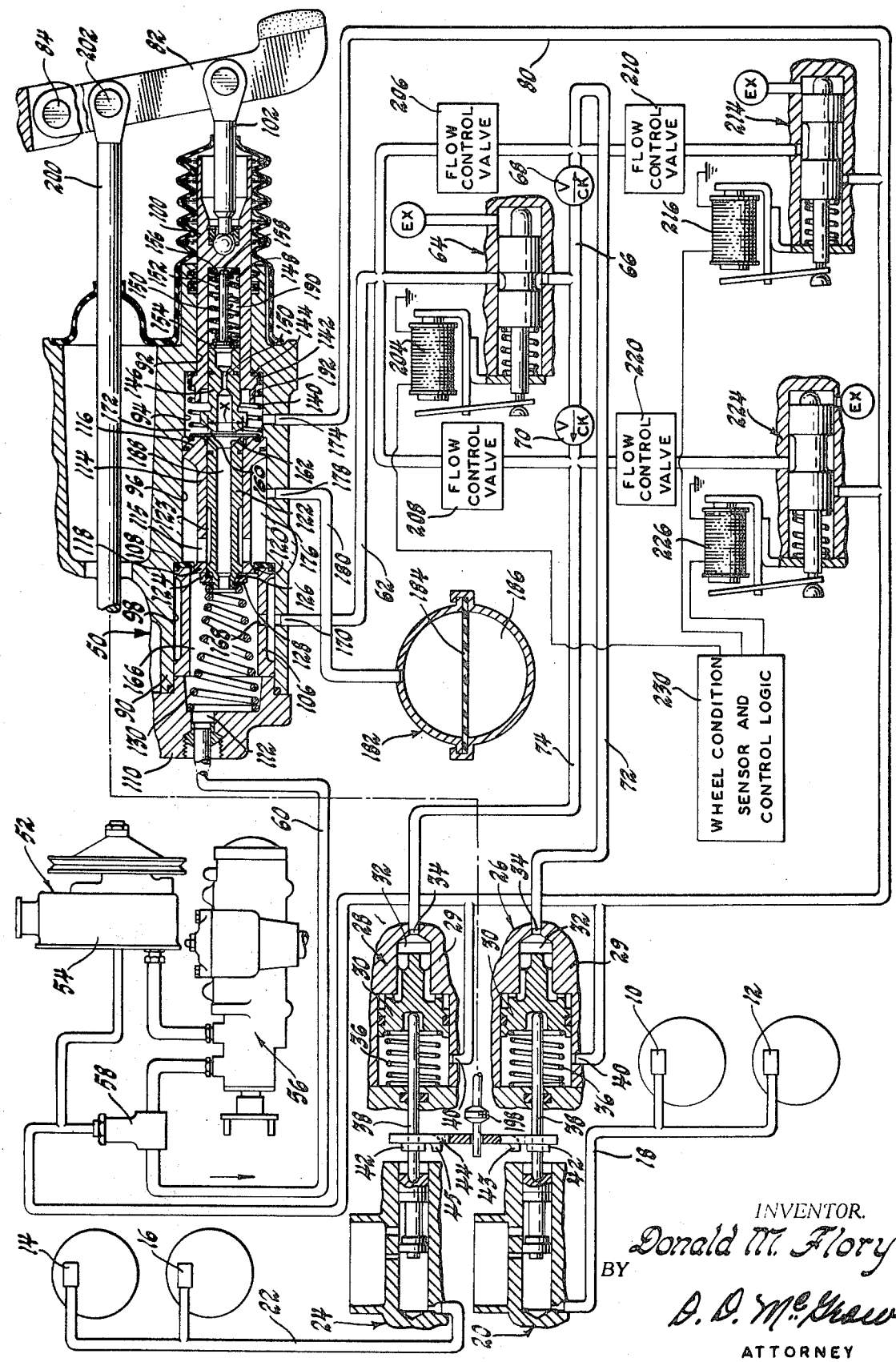
INVENTOR.
Donald M. Flory
BY
D. D. McGraw
ATTORNEY

ANTI-LOCK BRAKE SYSTEM

BACKGROUND OF THE INVENTION

The present invention relates to an anti-lock brake system and more particularly to an anti-lock system having fail safe features including a fail safe anti-lock control valve circuit, and both mechanical and hydraulic backup brake apply systems.

CROSS REFERENCE TO RELATED APPLICATIONS

The present invention is an improvement in the Anti-Lock Brake System, Ser. No. 95,468, filed Dec. 11, 1970, and assigned to the common assignee.

BRIEF SUMMARY OF THE INVENTION

The present invention relates to a brake system wherein a master cylinder and hydraulically actuated booster assembly are mounted in tandem for actuation of each wheel brake or set of wheel brakes to be controlled in unison. Pump generated hydraulic operating fluid is communicated to each booster assembly and through an open center brake control valve to the pump reservoir. Operator actuation of the brake control valve restricts fluid flow to the reservoir thus inducing a back pressure which actuates the plurality of boosters to actuate the associated master cylinders and wheel brakes associated therewith.

The invention features valve means in the brake control valve which charge an accumulator with the highest attained booster actuating pressure and then upon loss of pump generated fluid flow communicates the accumulator pressure to the plurality of boosters for backup actuation thereof.

The invention also features a mechanical linkage which connects the brake pedal with the plurality of master cylinders and functions to actuate the brakes when the degree of pedal travel is indicative of a loss of pump generated operating fluid flow and dissipation of the accumulator pressure.

Furthermore, the invention features a fail safe anti-lock control valve arrangement located intermediate the brake control valve and each of the boosters which cyclically releases and reapplies pressure to the boosters and assures that braking capability is not compromised upon malfunction of one of the valves.

BRIEF DESCRIPTION OF THE DRAWINGS

The many objects and advantages of the present invention will become apparent upon consideration of the following description and the accompanying drawing in which an anti-lock brake system embodying the invention is illustrated with parts broken away and in section.

DESCRIPTION OF THE PREFERRED EMBODIMENT

The Brake System in General

The anti-lock brake system of this invention is embodied in a motor vehicle having fluid pressure actuated front wheel brakes 10 and 12, and fluid pressure actuated rear wheel brakes 14 and 16. A conduit 18 connects brakes 10 and 12 with a conventional master cylinder 20 and a conduit 22 connects wheel brakes 14 and 16 with a second conventional master cylinder 24. Booster assemblies 26 and 28 are respectively associated with the master cylinders 20 and 24.

Booster assembly 26 includes a housing 29 having a power piston 30 sealingly slidable therein and cooperating therewith to form an expansible chamber 32 which communicates with fluid inlet port 34 formed in the housing 29. A spring 36 defines the rest position of power piston 30. Introduction of pressurized fluid into expansible chamber 32 displaces power piston 30 leftwardly actuating the master cylinder 20 through the push rod 38 extending therebetween. An exhaust port 40 is provided in housing 29 and communicates with the end of piston 30 opposite expansible chamber 32.

Booster assembly 28 is identical to booster 26 and the elements thereof are assigned corresponding reference numerals. The push rods 38 associated with boosters 26 and 28 include knobs 42 formed thereon intermediate the booster assembly and the master cylinder. A lever 44 is apertured to fit around push rods 38 intermediate the knob 42 and the booster assembly. Thus, it can be seen that lever 44 is engageable with both knobs 42 to provide unitary actuation of the master cylinders 20 and 24 independently of booster actuation. A pair of tangs 43 and 45 project from lever 44 and are respectively engageable with the housings of master cylinders 20 and 24 when the master cylinders are fully actuated by lever 44. In the event of a rupture of either conduit 18 or 20 during master cylinder actuation by lever 44, the engagement of the tank with the master cylinder connected to the ruptured line assures that the other master cylinder will be actuated by the lever 44.

An open center brake control valve, indicated generally at 50, is actuable by the vehicle operator to provide pump generated fluid pressure for actuation of the boosters 26 and 28. A fluid pump 52, illustrated as being a power steering pump, delivers a continuous flow of operating fluid from the pump reservoir 54 through the open center power steering gear 56, pressure relief valve 58, and conduit 60 to the open center brake control valve 50. The brake control valve 50 provides an unrestricted flow path from conduit 60 to conduit 62 which is in turn connected through a normally open anti-lock control valve 64, a conduit 66, check valves 68 and 70, and conduits 72 and 74 to the expansible chambers 32 of the booster assemblies 26 and 28. The open center brake control valve 50 also provides a flow path from pump 52 to conduit 80 which is connected to the exhaust ports 40 of the power boosters 26 and 28 and to the power steering pump reservoir 54. Brake actuation is initiated by movement of brake pedal 82 which is pivoted to the vehicle body at 84. Pedal actuation restricts the flow of pump generated fluid to exhaust conduit 80 giving rise to a back pressure which is communicated through conduits 62, 66, 72, and 74 to the boosters 26 and 28. A relaxation of the pedal actuating effort permits dissipation of the back pressure through exhaust conduit 80, thereby releasing the brakes.

The Brake Control Valve

The brake control valve 50 includes a housing 90 in which successively stepped bores 92, 94, 96, and 98 are formed. A sleeve 106 is inserted in bore 98 and seats an annular seal 108 against the shoulder formed by the juncture of bores 96 and 98. End cap 110 closes the end of housing 90 and includes an inlet port 112 through which conduit 60 introduces operating fluid from pump 52 to the chamber 166 formed radially inwardly of sleeve 106. Chamber 166 also communicates with the respective expansible chambers 32 of the booster assemblies 26 and 28 through a passage 168 in sleeve 106 and an outlet port 170 in housing 90 to which conduit 62 is connected.

An annular lockout piston 114 includes a first land 116 which is sealingly slidable in bore 96 of housing 90 and is engageable with the shoulder formed at the juncture of bores 94 and 96 to define the rest position of the lockout piston 114. A second land 118, of lesser diameter than and axially spaced from land 116, is slidable in sleeve 106. A clearance space 120 between land 118 and sleeve 106 is covered by seal 108 when the lockout piston is in the rest position. The annular chamber 176 formed between lockout piston 114 and housing 90 is communicated through outlet port 178 and conduit 180 to an accumulator 182. Accumulator 182 includes a diaphragm 184 forming a chamber 186 which is charged with a compressed gas.

An annular valve seat member 122 is sealingly slidable in the annular lockout piston 114 and carries a resilient O-ring 126 retained by a retainer 124 which is attached to the valve seat member 122 by a snap ring 128. A spring 130 seated at end cap 110 engages snap ring 128 urging the valve seat member 122 to a rest position relative lockout piston 114 wherein the O-ring 126 is sealingly seated upon lockout piston 114. The retainer 124 engages lockout piston 114 transmitting the force of spring 130 thereto whereby lockout piston 114 is held in its rest position. A passage 115 in lockout piston 114 and an annular chamber 123 formed by a necked down portion of valve seat member 122 provide fluid communication between chambers 166 and 176 when valve seat member 122 is urged from its rest position relative lockout piston 114 to unseat O-ring 126. A fluid passage 188 extends axially through valve seat member 122.

A valve actuating linkage includes reaction piston 100 which is sealingly slidable in bore 92 upon axial movement of a pedal push rod 102 which connects the reaction piston 100 with the brake pedal 82. A spring 140 acts between land 116 of lockout piston 114 and a shoulder 142 formed on reaction piston 100 to urge reaction piston 100 to a rest position wherein the shoulder 142 engages a resilient cushion 144 seated at the shoulder formed by the juncture of bores 92 and 94. Reaction piston 100 includes an abutment 192 which is engageable with lockout piston 114 during certain conditions to be hereinafter described. A valve member 146 having a fluid passage 150 extending axially therethrough is slidable in a bore 148 formed in reaction piston 100 and forms therewith a chamber 190. A pair of springs 150 and 152 located in chamber 190 are caged in compression between spring seats 154 and 156 which respectively engage heads formed on the ends of a pin 158. The caged springs 150 and 152 thereby establish a rest position between the valve member 146 and reaction piston 100. Axially aligned conical valve surfaces 160 and 162 are formed respectively on the adjacent ends of valve member 146 and valve seat member 122. A chamber 172 formed between valve member 146 and housing 90 is communicated through outlet port 174 and conduit 80 to the pump reservoir 54.

In operation, with the elements of brake control valve 50 in their respective rest positions, as shown in the drawing, fluid flow generated by pump 52 is communicated unrestrictedly and at substantially zero pressure from chamber 166 to the respective chambers 32 of the boosters 26 and 28, and also through passage 188 of the annular valve seat member 122 and between the valve surfaces 160 and 162 to the chamber 172 and thence to the pump reservoir 54. The connection of exhaust conduit 80 to the respective outlet ports 40 of the power boosters 26 and 28 pressure balances the pistons 30 to compensate for the tendency of the power steering system return pressure in conduit 80 to be slightly higher than atmospheric pressure.

Upon actuation of pedal 82, reaction piston 100 moves into housing 90 and springs 150 and 152 carry the valve surface 160 of valve member 146 into flow restricting proximity with the valve surface 162 formed on valve seat member 122. The resulting pressure increase in chamber 166 is communicated to the power boosters 26 and 28, thereby actuating the wheel brakes. The pressure in chamber 166 is also communicated through passages 188 and 150 to the chamber 190 where it acts upon reaction piston 100 to provide a reaction force on pedal 82 in proportion to the attained level of brake actuation. Since the chamber 166 pressure in passage 188 acts on an end area "X" of valve 146 which is greater than the opposing end area in chamber 190 acted upon by the chamber 166 pressure, springs 150 and 152 are compressed by the net pressure force and thereby provide an additional reaction force which is transmitted through reaction piston 100 to the brake pedal 82. Seal 108 acts as a check valve to communicate chamber 166 pressure through the clearance space 120 whenever the chamber 166 pressure exceeds the accumulator pressure in chamber 176 so that the accumulator pressure is maintained at a level equal to the highest attained chamber 166 pressure. Clearance space 120 restricts flow from chamber 166 to accumulator chamber 176 so that the quantity of fluid tapped from chamber 166 is small compared to the total pump generated flow. The accumulator pressure in chamber 176 acts upon the differential area of lockout piston 114 holding it in its rest position against the force transmitted through spring 140.

During brake actuation at a normal rate, valve member 146 remains poised from valve seat member 122 so that at least some flow is permitted between the valve surfaces 160 and 162. The maximum pressure which may be generated in chamber 166 is determined by the maximum load capacity of springs 150 and 152. When the reaction piston 100 is displaced into housing 90 to such an extent that the abutment 192 engages lockout piston 114, the valve member 146 acts as a pressure relief valve and so determines the brake runout pressure. The accumulator pressure acting on the differential area of lockout piston 114 prevents the reaction piston 100 from moving lockout piston 114 from its rest position.

Since the flow rate of the power steering pump 52 is limited and a quantity of fluid is required to displace the pistons 30 of boosters 26 and 28, the rate of force transmission through springs 150 and 152 as determined by the pedal actuating force may during a very rapid operator actuation exceed the rate of reaction force increase due to chamber 166 pressure. In this event, the valve member 146 engages valve seat member 122 completely blocking flow therebetween and moving valve seat member 122 from its rest position. Accumulator fluid in chamber 176 is thereby communicated through passage 115, annular chamber 123, and past the unseated O-ring 126 to chamber 166 to aid the pump generated flow in maintaining proportionality between brake pedal force and the level of wheel brake actuation.

In the event of a loss of fluid flow generated by power steering pump 52, accumulator pressure is utilized for actuation of the brake boosters 26 and 28. Springs 150 and 152 transmit pedal force to valve member 146 which is moved into engagement with the valve seat member 122 causing it to carry O-ring 126 away from land 118 of lockout piston 114 so that pressure from accumulator 182 is communicated from chamber 176 to chamber 166. This auxiliary pressure is also communicated through passage 150 and so provides a reaction force on reaction piston 100. The accumulator 182 may be sized to provide sufficient pressurized fluid for several reserve brake applications.

A mechanical actuating linkage is also provided to permit brake actuation in the event of complete dissipation of the accumulator pressure subsequent to a loss of pump generated fluid flow. When the pressure in accumulator 182 is depleted to such an extent that a chamber 166 pressure proportional to pedal force cannot be attained, the accumulator pressure in chamber 176 can no longer resist movement of lockout piston 114 by the abutment 192 of reaction piston 100. The pivotal movement of pedal 82 about pivot point 84 permitted by the resulting unitary movement of reaction piston 100 and lockout piston 114 into housing 90 causes a knob 198 formed on the end of a push rod 200 which is pivoted to the brake pedal 82 at 202 to move into engagement with the lever 44. The master cylinders 20 and 24 are then mechanically actuated through the force transmitting linkage including pedal 82, push rod 200, lever 44, and push rods 38. As the accumulator pressure is completely depleted, the pedal force is gradually transferred from push rod 102 to push rod 200, thereby minimizing the abruptness of the pedal reaction force change as the system reverts from accumulator power actuation to manual actuation. Push rod 200 is pivoted to brake pedal 82 at a point closer to pedal pivot 84 than is push rod 102 so that a higher mechanical advantage is had for mechanical brake actuation.

The Fail Safe Anti-Lock Control Circuit

The fail safe anti-lock control valve circuit which is located intermediate the brake control valve 50 and the boosters 26 and 28 functions to cyclically release and reapply pressure to the boosters and furthermore assures that braking capability is not compromised upon malfunction of any one valve. As hereinbefore stated, the path of booster operating pressure from brake control valve 50 to the boosters 26 and 24 is through conduit 62, the normally open anti-lock valve 64, conduit 66, and thence through check valve 68 and conduit 72 to booster 26 and through check valve 70 and conduit 74 to booster 28. The normally open anti-lock valve 64 has an actuating solenoid 204. Flow control valves 206 and 208 are respectively located between conduit 62 and conduits 72 and 74 in parallel flow relationship with the normally open anti-lock valve 64. The flow control valves 206 and 208 permit fluid flow from conduit 62 to conduits 72 and 74 at a limited rate but pass fluid freely in the other direction. A flow control valve 210 and a normally closed anti-lock valve 214 having an actuating solenoid 216 are located fluidly intermediate conduit 72 and exhaust conduit 80. Likewise, a flow control valve 220 and a normally closed anti-lock valve 224 having an actuating solenoid 226 are located fluidly intermediate the conduit 74 and exhaust conduit 80.

Energization of the solenoids 204, 216, and 226 of the respective anti-lock valves 64, 214, and 224 is by a wheel condition sensor and control logic 230. United States patent application Ser. No. 123,985 filed Mar. 15, 1971, now U.S. Pat. No. 3,680,923 issued Aug. 1, 1972, assigned to the common assignee, discloses as best shown in FIG. 1 a wheel condition sensor and control logic which may be used in conjunction with the present invention. Solenoid 204 of normally open valve 64 would be connected through an inverter to line 59 of FIG. 1. Solenoid coils 216 and 226 of the present invention correspond respectively to the solenoid coils 50 and 50' of FIG. 1.

During braking at normal levels, pressurized operating fluid from brake control valve 50 is communicated through conduit 62, normally open valve 64, conduit 66, and through check valves 68 and 70 and the conduits 72 and 74. The normally closed valve 214 blocks communication of conduit 72 pressure to the exhaust conduit 80 while the normally closed valve 224 blocks communication of the conduit 74 pressure to the exhaust conduit 80. The flow control valves 206 and 208 permit fluid communication from the boosters when chamber 166 pressure is decreased upon release of force from pedal lever 82.

If the level of fluid pressure communicated to the boosters 26 and 28 is excessive, an incipient wheel lock condition is created. If, for example, the wheel condition sensor and control logic 230 senses an impending lockup of the rear wheels braked by wheel brakes 14 and 16, solenoid coils 204 and 226 will be energized. Energization of solenoid coil 204 closes anti-lock control valve 64 so that chamber 166 pressure is communicated to the brake booster 28 at only a limited rate through flow control valve 208. Energization of solenoid coil 226 opens the normally closed valve 224 permitting communication of conduit 74 to the exhaust conduit 80. The flow rate of flow control valve 220 exceeds that of flow control valve 208 with the result that operating fluid is exhausted from chamber 32 of power booster 28 at a controlled rate to release the wheel brakes 14 and 16. Check valve 68 prevents the booster 26 from being affected by release of pressure from the booster 28. It is advantageous that the flow control valves 206, 208, 210, and 220 be of the type which provide a constant flow rate over a wide range of fluid pressures.

When the wheel speed has recovered to a suitable level, the wheel condition sensor and control logic deenergizes solenoid coil 226 permitting anti-lock control valve 224 to return to the normal closed position. The pressure in chamber 32 of brake booster 28 is then increased at a controlled rate through the flow control valve 208. Solenoid coil 204 remains energized to maintain control valve 64 in the closed position so that the wheel condition sensor and control logic 230 may cyclically open and close control valve 224 to cyclically apply and release the rear wheel brakes 14 and 16 until the excessive pedal actuation force is relieved or the vehicle is brought to a stop. The front wheel brakes 10 and 12 are controlled in a similar manner by cyclical energization and deenergization of solenoid coil 216.

The aforedescribed anti-lock control valve circuit provides fail-safe operation of the brakes. Regardless of a failure of any one of the valves to shift, fluid communication between the fluid pump and the booster is assured so that while anti-lock control of the brakes may not be accomplished, braking will not be lost altogether. For example, if valve 64 fails to return to its normal open position when the period of excessive brake actuation has ended, the brakes can be applied and released through flow control valves 206 and 208. Or, for example, if the valve 224 fails to return to its normal closed position when the wheel lock condition has been arrested, the combined flow through the open valve 64 and the flow control valve 208 exceeds the flow rate through flow control valve 220 to assure actuation of the booster 28.

It is noted that while the anti-lock brake system of this invention is herein described as including solenoid actuated anti-lock control valves operated by an electronic control logic, it is within the scope of this invention to utilize alternate means of wheel condition sensing which may operate the anti-lock control valves hydraulically or mechanically. Furthermore, the fail-safe anti-lock valve circuit of this invention may be advantageously used in an anti-lock brake system utilizing a fluid pressure operated brake pressure modulator located intermediate a master cylinder and the wheel brake.

It is noted that the various components of the invention are shown somewhat schematically in the drawing and that it is advantageous to compactly house the brake control valve 50, the booster assemblies 26 and 28, the master cylinders 20 and 24 and the anti-lock control valve circuit in a single housing with the various fluid conduits provided in the form of passages through the housing.

What is claimed is:

1. In a motor vehicle having a fluid pressure operated brake actuating device, a pump, and a reservoir, the combination comprising;
   conduit means communicating operating fluid from the pump means to the brake actuating device;
   open center valve means including a movable valve seat member and a movable valve member and communicating the operating fluid from the pump means to the fluid reservoir when in the open center position whereby the operating fluid pressure is substantially zero;
   means including the pressure force of the operating fluid for holding the valve seat member normally stationary;
   operator actuatable means adapted to progressively move the valve member relative the valve seat member to restrict fluid communication with the reservoir thereby providing operating fluid pressure to the brake actuating device;
   an accumulator;
   a check valve for communicating operating fluid to the accumulator whenever the operating fluid pressure exceeds the accumulator pressure;
   and valve means including the normally stationary movable valve seat member for normally blocking communication of accumulator pressure to the brake actuating device, the valve seat member being engaged and moved by the valve member when force applied thereagainst by the operator actuatable means exceeds the force of the means for holding the valve seat member stationary whereby the accumulator pressure is communicated to the brake actuating device.

2. In a motor vehicle having a fluid pressure operated brake actuating device, a pump providing a source of fluid flow and pressure, and a reservoir, the combination comprising:
   a housing forming a first chamber in fluid communication with the pump means and a second chamber in fluid communication with the reservoir;
   a lockout piston having axially spaced lands slidably engaging the housing and forming therewith a third chamber;
   an accumulator in fluid communication with the third chamber, the accumulator pressure holding the lockout piston in a normal position in the housing;
   check valve means communicating operating fluid from the first chamber to the third chamber whenever the first chamber pressure exceeds the third chamber pressure;
   a valve seat member having a fluid passage therethrough connecting the first and second chambers, the valve seat member being slidable in the lockout piston and forming therewith a first valve selectively permitting communication between the first and third chambers;
   means including the operating fluid pressure in the first chamber for holding the first valve normally closed;
   a valve member in the second chamber being normally spaced from the fluid passage through the valve seat member to permit unrestricted fluid communication from the pump means to the reservoir;
   operator actuatable means slidable in the housing and connected for moving the valve member into flow restricting proximity with the valve seat member to increase the first chamber pressure, for further moving the valve member into engagement with and moving the valve seat member to open the first valve and thereby communicate third chamber pressure to the first chamber.

3. In a motor vehicle having a plurality of fluid pressure operated wheel brakes, a plurality of master cylinders, each master cylinder being fluidly connected to at least one wheel brake, a fluid pressure operated booster associated with each master cylinder for actuation thereof, a pump means providing a source of fluid flow and pressure, and a reservoir, the combination of:
   conduit means communicating the operating fluid from the pump means to each of the boosters;
   a housing forming a first chamber in fluid communication with the pump means and a second chamber in fluid communication with the reservoir;
   a lockout piston having axially spaced lands slidably engaging the housing and forming therewith a third chamber;
   an accumulator in fluid communication with the third chamber, the accumulator pressure holding the lockout piston in a normal position in the housing;
   check valve means communicating operating fluid from the first chamber to the third chamber whenever the first chamber pressure exceeds the third chamber pressure;

a valve seat member having a fluid passage therethrough connecting the first and second fluid chambers, being slidable in the lockout piston, and forming therewith a first valve selectively permitting communication between the first and third chambers;

means holding the first valve normally closed;

a valve member in the third chamber being normally spaced from the fluid passage through the first valve seat member to permit unrestricted fluid communication from the pump means to the reservoir;

operator actuable means slidable in the housing and connected for moving the valve member into flow restricting proximity with the valve seat member to increase the first chamber pressure, for further moving the valve member into sealing engagement with the valve seat member to open the first valve and being further movable to engage and move the lockout piston subsequent to a substantial dissipation of third chamber pressure;

a force transmitting linkage connecting the operator actuable means with the plurality of master cylinders for actuation thereof upon overtravel of the operator actuable means consequent with movement of the lockout piston;

and anti-lock valve means in said conduit means fluidly intermediate the pump means and at least one of the boosters and adapted to selectively reduce and reapply the operating fluid pressure to the booster.

4. In a motor vehicle having wheels, fluid pressure operated wheel brakes adapted to impart braking effort to the wheels, means providing braking pressure for operation of the wheel brakes, brake pressure controlling means responsive to pressure variations and effective to modulate braking pressure to the wheel brakes for preventing wheel lockup, pump means including a reservoir and providing fluid pressure for operation of the brake pressure controlling means, and wheel condition sensing and control logic means, a fail safe valve circuit operated by the wheel condition sensing and control logic means and adapted to provide the pressure variations for operation of the brake pressure controlling means and comprising:

first conduit means connecting the pump means and the brake pressure controlling means;

normally open valve means in the first conduit means being shifted by the wheel condition sensing and control logic means upon impending wheel lock to block fluid communication therethrough;

a first flow rate control valve in parallel flow relationship with the normally open valve means and providing fluid communication at a limited rate from the pump means to the brake pressure controlling means;

second conduit means connecting the brake pressure controlling means and the reservoir;

a second flow rate control valve in the second conduit means limiting the rate of fluid communication therethrough to a lesser extent than the first flow rate control valve and to a greater extent than the combined fluid communication through the normally open valve means and the first flow rate control valve;

and normally closed valve means in the second conduit means being cyclically shifted between the normal closed position and an open position during the sensed wheel lock condition whereby the pressure at the brake pressure controlling means is cyclically reduced through the second flow rate control valve and increased through the first flow rate control valve, the normally closed valve means remaining in the closed position when the wheel lock condition has been arrested and the normally open valve means being returned to the open position to reestablish unrestricted fluid communication between the pump means and the brake pressure controlling means.

5. In a motor vehicle having a plurality of fluid pressure operated wheel brakes, each master cylinder being fluidly connected to at least one wheel brake, a fluid pressure operated booster associated with each master cylinder for actuation thereof, and means providing fluid pressure for operation of the boosters, the combination of:

first conduit means connecting the means providing fluid pressure and the plurality of boosters;

a single normally open valve means in the first conduit means being shifted upon impending wheel lock to block fluid communication therethrough;

a plurality of check valve means in the first conduit means each being fluidly intermediate the normally open valve means and one of the boosters and permitting fluid communication through the first conduit only in the direction from the means providing fluid pressure to the booster;

a first plurality of flow rate control valves, each being connected in parallel flow relationship with the normally open valve means and one of the check valve means and providing fluid communication at a limited rate from the means providing fluid pressure to the associated booster;

second conduit means connecting each of the boosters with the reservoir;

a second plurality of flow rate control valves in the second conduit means, each being fluidly intermediate one of the boosters and the reservoir and each limiting the rate of fluid communication therebetween to a lesser extent than the associated flow rate control valve in the first conduit means and to a greater extent than the combined fluid communication through the normally open valve means and the associated flow rate control valve in the first conduit means;

and a plurality of normally closed valve means in the second conduit means, each being fluidly intermediate one of the boosters and the reservoir and being individually cyclically shifted between the normal closed position and an open position during the sensed wheel lock condition whereby the pressure at the associated booster is cyclically reduced at a controlled rate through the flow rate control valve in the second conduit means and increased through the flow rate control valve in the first conduit means, the normally closed valve means remaining in the closed position when the wheel lock condition has been arrested and the normally open valve means being returned to the open position to reestablish unrestricted fluid communication between the means providing operating fluid and the booster.

* * * * *